Feb. 23, 1926.

B. M. COFFEE

BEARING CONSTRUCTION

Filed August 3, 1923

1,574,470

INVENTOR
Bassett M. Coffee
BY Robert S. Blair
ATTORNEY

Patented Feb. 23, 1926.

1,574,470

UNITED STATES PATENT OFFICE.

BASSETT M. COFFEE, OF NEW HAVEN, CONNECTICUT, ASSIGNOR TO THE SAFETY CAR HEATING & LIGHTING COMPANY, A CORPORATION OF NEW JERSEY.

BEARING CONSTRUCTION.

Application filed August 3, 1923. Serial No. 655,431.

*To all whom it may concern:*

Be it known that I, BASSETT M. COFFEE, a citizen of the United States, and a resident of New Haven, in the county of New Haven and State of Connecticut, have invented an Improvement in Bearing Construction, of which the following is a specification.

This invention relates to construction for bearings and the like and with regard to its more specific features to construction for bearings for members having an oscillating or reciprocating movement.

One of the objects of the invention is to provide a construction of the above nature strong and dependable and capable of meeting the requirements of use in a highly satisfactory manner. Another object is to provide a construction of the above nature wherein highly efficient lubrication is dependably attained. Another object is to provide such a construction capable of reliable operation and long wear. Another object is to provide a construction of the above nature wherein the parts are readily assembled and easily accessible for cleaning, replacement or repair. Other objects will be in part obvious or in part pointed out hereinafter.

The invention accordingly consists in the features of construction, combination of elements, and arrangements of parts all as will be illustratively herein described and the scope of the application of which will be indicated in the following claims.

Figure 1:
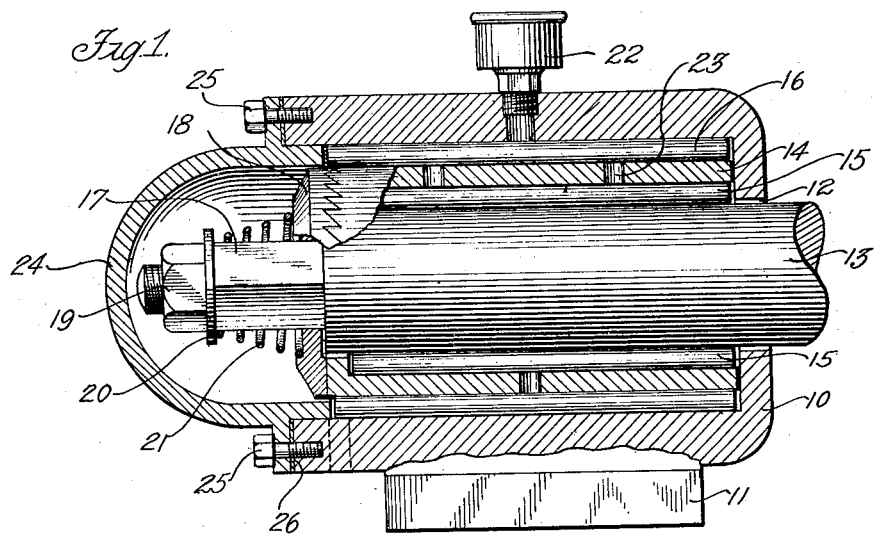
Figure 2:
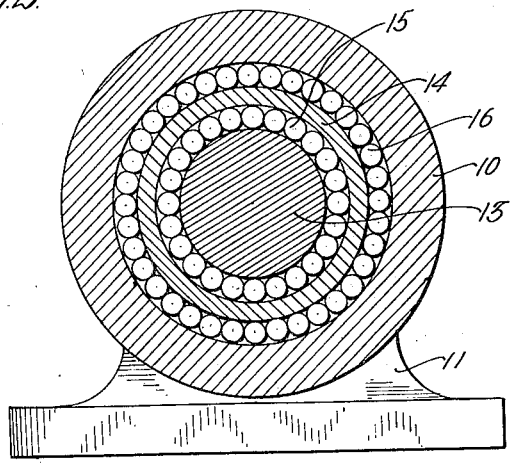

In the accompanying drawing in which is shown one of the various possible embodiments of this invention, Figure 1 is a vertical, sectional elevation and Figure 2 is a section taken substantially along the line 2—2 of Figure 1.

Similar reference characters refer to similar parts in both views of the drawing.

Referring now to the drawing in detail, there is shown an outer housing 10 supported upon a suitable pedestal as 11 and provided with an opening 12 through which passes a shaft or journal 13. The journal 13 oscillates about its longitudinal axis within the housing 10. It may here be pointed out that proper and satisfactory lubrication of an oscillating journal and its bearing is difficult of attainment. Since an oscillating journal turns only through a relatively small angle and back again, it does not properly distribute the lubricant in the ordinary type of bearing. Furthermore, when anti-friction devices are employed in the bearing the load is carried by a few of the rollers or balls as the case may be which move back and forth across the point of support with the oscillating journal. These conditions naturally result in accelerated wear of the bearing and one of the aims of this invention is to provide practical means for effectively overcoming such difficulties.

About the oscillating journal 13 within the housing 10 is positioned a sleeve member 14. Between the sleeve member 14 and the shaft or journal 13 are interposed anti-friction devices preferably taking the form of a set of rollers 15 and between the sleeve 14 and the inner wall of the housing 10 is interposed another series of anti-friction devices such as rollers 16. The end portion 17 of the journal 13 is squared and slidably mounted thereon is a member 18 taking the form of a crown ratchet. The left hand end of the sleeve 14 is provided with ratchet teeth adapted to coact with the ratchet teeth of the member 18. Threaded upon the extreme end of the journal 13 is a nut 19 provided with a flange 20 between which and the ratchet member 18 is interposed a compression spring 21. The ratchet member 18 slidable along the part 17 is thus urged into engagement with the ratchet teeth of the sleeve 14 by the action of the spring 21. The ratchet teeth on the member 18 and the coacting teeth on the sleeve 14 are shaped so that when the journal 13 turns in one direction the sleeve 14 will be turned therewith through the ratchet mechanism, whereas when the journal 13 turns in the opposite direction the teeth slip over one another, the spring 21 yielding to permit such action.

Thus as the journal 13 oscillates turning through a small angle and back again, the sleeve 14 is given an intermittent rotation in one direction about the journal. If grease is used as a lubricant it may be introduced as by means of a grease cup 22 to the space about the rollers 16, and the sleeve 14 is preferably provided with passages 23 to permit access of the grease to the rollers 15 and the journal 13. The left hand end of the housing 10 is closed by means of a cap 24 secured by lug bolts such as 25 and made tight by packing such as 26. If oil is used as a lubricant, the lower portion of the housing may serve as a reservoir being filled with the oil for example up to the level of the opening 12.

As the sleeve 14 is intermittently and uni-directionally rotated about the oscillating journal 13 the rollers 15 and 16 in rolling contact therewith are likewise revolved about the axis of the journal. In thus moving about the axis of the journal, the sleeve and the rollers carry lubricant with them and serve to evenly distribute the lubricant over all of the moving parts. Furthermore, it will be seen that the load is progressively carried by each roller of the two series and by different portions of the sleeve 14, thus distributing any wear uniformly over large surfaces. By proper selection of the pitch of the ratchet teeth the speed of rotation given to the sleeve 14 may be determined. In the case of a journal oscillating at varying amplitudes it may be desirable to have the sleeve 14 rotated only under the influence of the oscillations of maximum amplitude. In other cases it may be desirable to rotate the sleeve 14 at every oscillation of the journal.

From the above it will be seen that there is herein provided a device which embodies the features of this invention and attains the objects thereof, and that the same is well adapted to meet the requirements of practical use. The construction is one which insures reliable operation and which embodies many practical and useful advantages.

As various possible embodiments might be made of the above invention and as various changes might be made in the embodiment above set forth without departing from the scope of the invention, it is to be understood that all matter herein set forth or shown in the accompanying drawing is to be interpreted as illustrative and not in a limiting sense.

I claim as my invention:

1. In bearing construction, in combination, a member having a reciprocatory motion, a member adapted to support said first member, means interposed between said two members adapted to distribute lubricant over the surfaces thereof, and means adapted to give said lubricant distributing means a uni-directional movement during said reciprocation of said first member.

2. In bearing construction, in combination, a member having a reciprocatory motion, a member adapted to support said first member, anti-friction members interposed between said two members, and means adapted to move said anti-friction members in one direction and relative to both said reciprocating member and said supporting member to distribute the wear thereon during said reciprocation of said first member.

3. In bearing construction, in combination, an oscillating journal, a housing thereabout, means interposed between said journal and said housing adapted to distribute lubricant over the surfaces thereof, and means adapted to move said last means about the entire surface of said journal as the latter oscillates through less than 180°.

4. In bearing construction, in combination, an oscillating journal, a housing thereabout, a substantially continuous series of anti-friction members about said journal between the same and said housing, and means adapted to shift said anti-friction members relative to said journal and said housing to distribute the wear throughout the entire number thereof as said journal oscillates.

5. In bearing construction, in combination, a member having a reciprocatory movement, a stationary member adapted to support said first member, anti-friction members interposed between said two members, and means actuated by said first member adapted to intermittently shift the position of said anti-friction members relative to said stationary member.

6. In bearing construction, in combination, an oscillating journal, a stationary housing thereabout, anti-friction means between said journal and said housing, and means adapted to move said antifriction means about said journal and relative to said housing a predetermined distance in one direction at each oscillation of said journal.

7. In bearing construction, in combination, a member having a reciprocatory movement, a member adapted to support said first member, a member interposed between said two members, anti-friction means on either side of said last member, and means actuated by said first member adapted to intermittently move said last member to move said antifriction means.

8. In bearing construction, in combination, a journal, a housing thereabout, a sleeve member between said journal and said housing, anti-friction means between said journal and said sleeve, anti-friction means between said housing and said sleeve, and means adapted positively to move said sleeve about said journal.

9. In bearing construction, in combination, a journal, a housing thereabout, a sleeve member between said housing and said journal, anti-friction means on either side of said sleeve, and means actuated by said journal adapted positively to rotate said sleeve to move said anti-friction means about said journal.

10. In bearing construction, in combination, an oscillating journal, a housing, thereabout, a sleeve member between said journal and said housing, anti-friction means on either side of said sleeve, and means actuated by said journal adapted to give said sleeve a uni-directional rotation about said journal.

11. In bearing construction, in combination, an oscillating journal, a housing thereabout, a sleeve member between said journal and said housing, anti-friction means on either side of said sleeve, and a ratchet mechanism adapted to rotate said sleeve from said journal in one direction about the same.

12. In bearing construction, in combination, an oscillating journal, a housing thereabout, a sleeve member between said journal and said housing, anti-friction means between said journal and said sleeve, anti-friction means between said housing and said sleeve, means adapted to introduce lubricant to said housing, means adapted to permit passage of lubricant through said sleeve, and means adapted to give said sleeve a uni-directional rotation.

13. In bearing construction, in combination, an oscillating journal, a housing thereabout, a sleeve member between said journal and said housing, anti-friction means between said journal and said sleeve and between said housing and said sleeve, a ratchet member movable with said journal, ratchet teeth on said sleeve adapted to coact with said ratchet member, and resilient means urging said ratchet members together.

14. In bearing construction, in combination, an oscillating member, a stationary support therefor, anti-friction means interposed between said member and said support, and means driven from said oscillating member adapted to give said anti-friction means a unidirectional rotation thereabout and relative to said support.

15. In bearing construction, in combination, an oscillating member, a stationary support therefor, anti-friction means interposed between said oscillating member and said support, and a ratchet mechanism actuated by said oscillating member adapted to give said anti-friction means a uni-directional rotation about said oscillating member and relative to said support.

16. In bearing construction, in combination, an oscillating member, a support therefor, anti-friction means interposed between said oscillating member and said support, means adapted upon movement to move said anti-friction means about said oscillating member, means driven from said oscillating member, and resilient means urging said last two means into driving engagement.

17. In bearing construction, in combination, an oscillating journal, a housing thereabout, a sleeve interposed between said journal and said housing, a connection between said journal and said sleeve adapted to give the latter a uni-directional rotation in response to the oscillations of the former, and lubricant-distributing means adapted to move about said journal in response to said uni-directional movement of said sleeve.

In testimony whereof, I have signed my name to this specification this 26th day of July 1923.

BASSETT M. COFFEE.